(12) United States Patent
Götz et al.

(10) Patent No.: US 7,127,475 B2
(45) Date of Patent: Oct. 24, 2006

(54) MANAGING DATA INTEGRITY

(75) Inventors: Martina Götz, Schwegenheim (DE); Michael Schmitt, Reichelsheim (DE); Steffen Lutz, Rodalben-Neuhof (DE)

(73) Assignee: SAP Aktiengesellschaft, Walldorf (DE)

( * ) Notice: Subject to any disclaimer, the term of this patent is extended or adjusted under 35 U.S.C. 154(b) by 395 days.

(21) Appl. No.: 10/219,929

(22) Filed: Aug. 15, 2002

(65) Prior Publication Data
US 2004/0034668 A1 Feb. 19, 2004

(51) Int. Cl.
*G06F 17/30* (2006.01)
(52) U.S. Cl. .................. 707/201; 707/200
(58) Field of Classification Search ......... 707/200–204
See application file for complete search history.

(56) References Cited

U.S. PATENT DOCUMENTS

| | | | |
|---|---|---|---|
| 4,714,995 A | 12/1987 | Materna et al. ............ | 707/201 |
| 5,239,637 A | 8/1993 | Davis ..................... | 711/165 |
| 5,717,915 A | 2/1998 | Stolfo et al. .............. | 707/5 |
| 5,721,912 A | 2/1998 | Stepczyk et al. .......... | 707/102 |
| 5,751,958 A | 5/1998 | Zweben et al. ........... | 709/204 |
| 5,778,373 A | 7/1998 | Levy et al. .............. | 707/100 |
| 5,787,443 A | 7/1998 | Palmer ................... | 707/202 |
| 5,796,999 A | 8/1998 | Azagury et al. .......... | 707/10 |
| 5,870,605 A | 2/1999 | Bracho et al. ............ | 719/318 |
| 5,870,765 A | 2/1999 | Bauer et al. ............. | 707/203 |
| 5,873,096 A | 2/1999 | Lim et al. ............... | 707/201 |
| 6,182,121 B1* | 1/2001 | Wlaschin ................ | 709/215 |
| 6,212,529 B1 | 4/2001 | Boothby ................. | 707/201 |
| 6,226,650 B1 | 5/2001 | Mahajan et al. .......... | 707/201 |
| 6,256,676 B1 | 7/2001 | Taylor et al. ............ | 709/246 |
| 6,304,882 B1 | 10/2001 | Strellis et al. ........... | 707/202 |
| 6,317,797 B1* | 11/2001 | Clark et al. ............. | 710/5 |
| 6,446,075 B1* | 9/2002 | Velasco .................. | 707/102 |
| 6,446,092 B1 | 9/2002 | Sutter ................... | 707/203 |
| 6,671,757 B1 | 12/2003 | Multer .................. | 710/100 |
| 6,718,348 B1* | 4/2004 | Novak et al. ............ | 707/201 |
| 7,032,003 B1* | 4/2006 | Shi et al. ............... | 709/203 |
| 2002/0156798 A1* | 10/2002 | Larue et al. ............. | 707/201 |

FOREIGN PATENT DOCUMENTS

| | | |
|---|---|---|
| EP | 0 592 045 | 4/1994 |
| WO | WO 93/04436 | 3/1993 |
| WO | WO 00/79408 | 12/2000 |
| WO | WO 01/27806 | 4/2001 |

OTHER PUBLICATIONS

Durbaon, S.D., et al., Interconnection of Distributed Components: An Overview of Current Middleware Solutions, Journal of Computing and Information Science in Engineering, vol. 1, Mar. 2001, pp. 23-31.

Gray et al., The Dangers of Replication and a Solution, ACM SIGMOD Record, Jun. 1996, pp. 173-182.

Huston et al., Disconnected Operation for AFS, Proceedings of the USENIX Mobile and Location-Independent Computing Symposium, Cambridge, MA, Aug. 2-3, 1993, USENIX Association, pp. 1-10.

* cited by examiner

*Primary Examiner*—Leslie Wong
*Assistant Examiner*—Susan F. Rayyan
(74) *Attorney, Agent, or Firm*—Fish & Richardson P.C.

(57) ABSTRACT

Techniques are provided to manage the integrity of data stored in two or more data management systems by detecting inconsistencies between the data management systems. The techniques identify missing records in one or more data management systems by comparing the records in the data management systems. For records that exist in two or more data management systems, the techniques identify records that are not identical in the data management systems. A user checkpoint is provided between the identification of missing records and the identification of records that are not identical. The detected inconsistencies also may be corrected.

31 Claims, 10 Drawing Sheets

MANAGING DATA INTEGRITY

TECHNICAL FIELD

This description relates to techniques for data management.

BACKGROUND

A database, such as a relational database, an object-oriented database, or another type of data management system, may be used for the administration of data processed by a computer system running one or more application programs or systems. Examples of application programs or systems include an enterprise resource management system, a customer relationship management system, a human resources management system, a supply chain management system, and a financial management system.

Identical records may exist in more than one data management system. Some data in one or more data management systems may be incorrect because of inconsistencies in records that should be identical in two or more data management systems. Data may be inconsistent, for example, when a record is missing from a data management system in which the record should reside or when a record includes incorrect values.

Copying all of the necessary records from one data management system to a second data management system may be an impractical method to correct inconsistent data in some cases, such as when the time required to copy and load a large volume of data into a data management system is disruptive to the operation of the data management system. An alternative to copying all of the records is to detect and correct the inconsistent data.

Inconsistent data may be detected by comparing records stored in two data management systems to identify records that occur in one data management system and do not occur in the other data management system. One method of comparing records to identify duplicate records in a single database includes sorting records by a field, such as a key or identifier field, that may be used to identify similar or matching records. The field values of two records then are compared to determine whether the field values match. If so, the records may be identified as duplicates of one another.

SUMMARY

Techniques are provided to manage the integrity of data stored in two or more data management systems by detecting inconsistencies between the data management systems. In one general aspect, the techniques identify missing records in one or more data management systems by comparing the records in the data management systems. For records that exist in two or more data management systems, the techniques identify records that are not identical in the data management systems. A user checkpoint is provided between the identification of missing records and the identification of records that are not identical. In some cases, the detected inconsistencies also may be corrected.

An enterprise system may include more than one data management system. For instance, an enterprise system may include a database used by on-line clients, another database that is used to synchronize off-line clients, and yet another database that is used for back-end processing of information entered by on-line clients and off-line clients. The enterprise system may operate accurately only when the data in all three databases is consistent. When the data in different databases is consistent, the databases may be referred to as synchronized. Similarly, an enterprise system may operate accurately only when data in a data management system of an enterprise system is synchronized with data in a data management system of a different enterprise system.

Inconsistent data may occur in two or more data management systems because of many conditions, such as when initial data loading for the implementation of a new data management system has not loaded all the records from a related data management system. For example, an initial data loading process may abort during operation and fail to load all records. Inconsistent data may also occur when one of the data management systems fails, such as when hardware fails to operate correctly or when a programming error in the data management system occurs. Inconsistent data may occur in two data management systems even when the data management systems communicate data modifications between them using an automated messaging system. For example, messages sent to one of the data management systems that identify the data to be updated may have been deleted or the data management system may have been reset to an earlier state that deletes some of the data in the data management system. Inconsistent data may occur when a process used to synchronize data in two or more data management systems does not exist or is inactive for a period of time.

Inconsistent data also may occur when a data management system that had been synchronized with another data management system undergoes a database recovery process to correct a problem with the data management system. The database recovery process may be initiated to reset data in the data management system to match data that was present in the data management system at a particular point in time. A database recovery process may result in the loss of data that had been entered after the particular point in time. When data that had been entered into a data management system to synchronize the data management systems is lost, the two data management systems may no longer be synchronized.

Inconsistent data may occur when data is validated by two different data management systems. When data validation is performed using different validation rules for the same data, data may be accepted by one data management system and rejected by the other data management system.

Data inconsistencies between two or more data management systems may be difficult to detect. For example, the data management systems may use different data models that requires data to be transformed (or converted) to a different data structure to be compared accurately. Data inconsistencies also may be difficult to detect when the amount of data to be compared is large, such as when a data management system includes millions of records or uses complicated data structures with many relationships among the data objects.

Data consistency across two or more data management systems may be improved by the separation of the detection of duplicate records in each of the data management systems from the detailed comparison of values in the duplicate records. A user or system administrator may determine whether to proceed with the more complicated detailed comparison of values based on the detection of duplicate records.

Additionally or alternatively, data consistency may be improved across two or more data management systems when a user or system administrator identifies which portions of the data stored in the data management system are used in the detection of duplicate records and/or the detailed comparison of values. The identification of portions of the data may be accomplished through the application of filter criteria to the data to select a subset of the data that is compared. Identifying a subset of the data may be particularly advantageous when the amount of data in a data management system is large or when different entities are responsible for the integrity of subsets of the data. For example, responsibility for data integrity (which may be referred to as data ownership) may be based on an organizational unit associated with the subset of data, a geographic region associated with the subset of data, or a subset of data that includes a particular type of data (e.g., sales documents, customer account information, or product inventory).

In one general aspect, when data integrity is managed in a first data management system and a second data management system, each system stores a plurality of data collections with each data collection having at least one attribute that uniquely identifies a single data collection from the other data collections. A user is provided with an indication of the identity of one or more data collections from the data collections stored in the first and second data management systems. The data collections identified are to be the subject to a future data integrity management process. The user is permitted to determine whether to proceed with managing data integrity. After receiving an indication from the user to proceed, managing the data integrity of the data collections identified in the presence detection proceeds.

Implementations may include one or more of the following features. For example, the data integrity management process may be paused. An indication whether to proceed with managing the data integrity of data collections may be received from the user. The number of data collections that occur in both the first data management system and the second data management system may be presented. The number of data collections that occur only in the first data management system may be presented as may the number of data collections that occur only in the second data management system. A data collection may include an object instance, a data record, a row in a database table, or a data segment. The data collections may have more than one attribute that uniquely identifies a single data collection from the other data collections.

From the first data management system, a first group of values of a uniquely identifying attribute may be extracted. From the second data management system, a second group of values of the uniquely identifying attribute may be extracted. Each extracted value of the uniquely identifying attribute may be associated with a single data collection.

A first group of data collections may be extracted from the first data management system, and a second group of data collections may be extracted from the second data management system. Each extracted data collection may be associated with a set of attribute values.

An indication of a data collection that is included both in the first data collection extracted from the first data management system and the second data collection extracted from the second data management system may be received from a user. Each single data collection may have a first set of attribute values associated with the first group of data collections and a second set of attribute values associated with the second group of data collections. The user may be provided with an indication of whether the first set of attribute values is equal to the second set of attribute values.

Detected inconsistencies may be corrected by sending one or more data collections from the first data management system to the second data management system or by sending the one or more data collections from the second data management system to the first data management system.

Detected inconsistencies may be corrected by deleting one or more data collections from the first data management system or from the second data management system.

In another general aspect, when managing data integrity in a leading data management system and a contrast data management system, a first group of values of attributes that uniquely identify a single data collection from the other data collections is extracted from the leading data management system. A second group of values of attributes that uniquely identify a single data collection from the other data collections is extracted from the contrast data management system. The first group of values of the uniquely identifying attribute is compared with the second group of values of the uniquely identifying attribute to determine whether each value of the uniquely identifying attribute in the first group represents the same data collection as a value of the uniquely identifying attribute in the second group. A list of the values of the uniquely identifying attribute that are associated with both the leading data management system and the contrast data management system, the values of the uniquely identifying attribute that are associated with only the leading data management system, and the values of the uniquely identifying attribute that are associated with only the contrast data management system is presented. The user is permitted to determine whether to proceed with managing data integrity. After receiving an indication from the user to proceed, a first group of attribute value sets is extracted from the leading data management system. Each extracted attribute value set is associated with a single data collection that is included in both the leading data management system and the contrast data management system. A second group of attribute value sets is extracted from the contrast data management system. Each extracted attribute value set is associated with a particular data collection that is included in both the leading data management system and the contrast data management system. For each attribute value set extracted from the leading data management system, the attribute value set from the contrast data management system that represents the same data collection is identified. The attribute value set from the leading data management system is compared with the attribute value set from the contrast data management system to determine whether the attribute value sets match. An indication whether the attribute value set from the leading data management system matches the attribute value set from the contrast data management system is presented.

Implementations may include one or more of the following features. For example, managing data integrity may include receiving an indication from a user to compare data collections in the leading data management system with data collections in the contrast data management system. Managing data integrity may include determining which values of the uniquely identifying attribute are associated with both the leading data management system and the contrast data management system, which values of the uniquely identifying attribute are associated with only the leading data management system, and which values of the uniquely identifying attribute are associated with only the contrast data management system. Managing data integrity may include presenting the number of the values of the uniquely identifying attribute are associated with both the leading data management system and the contrast data management system, the number of the values of the uniquely identifying attribute are associated with only the leading data management system, and the number of the values of the uniquely identifying attribute are associated with only the contrast data management system.

Implementations of the techniques discussed above may include a method or process, an apparatus or system, or computer software on a computer-accessible medium. The details of particular implementations are set forth below in the description and the accompanying drawings. Other features will be apparent from the description and drawings, and from the claims.

DESCRIPTION OF THE DRAWINGS

Like reference symbols in the various drawings indicate like elements.

DETAILED DESCRIPTION

Figure 1:
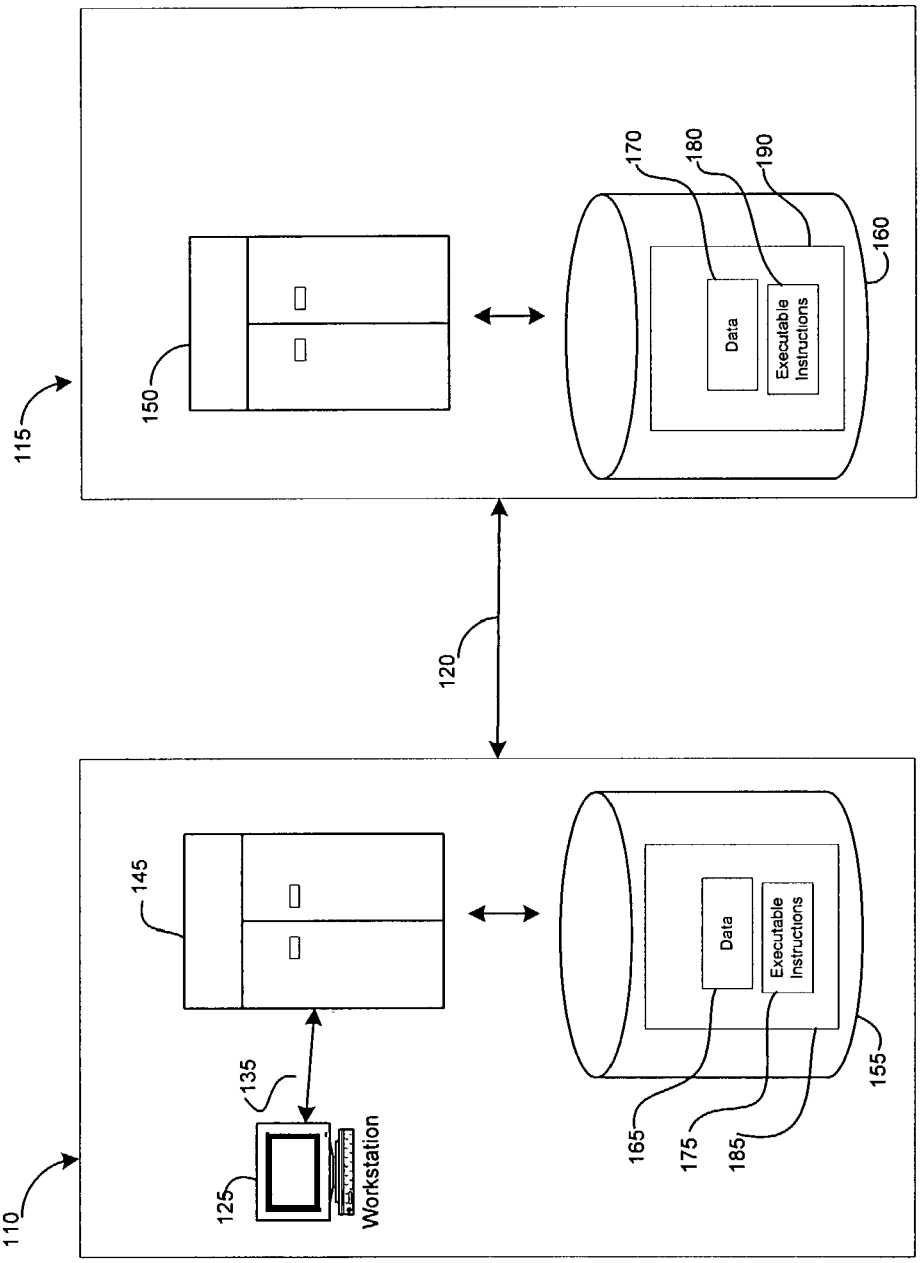
FIG. 1 is a block diagram of a system for managing data integrity in two or more data management systems.

FIG. 1 shows a block diagram of a system 100 that may be involved in the management of the data integrity of two computer systems 110 and 115. Computer systems 110 and 115 are capable of delivering and exchanging data through a communications link 120.

Computer system 110 includes a data integrity workstation 125 connected through a communication pathway 135 to an enterprise server 145. A workstation 125 and an enterprise server 145 may be arranged to operate within or in concert with one or more other systems, such as, for example, one or more LANs ("Local Area Networks") and/or one or more WANs ("Wide Area Networks"). The data integrity workstation 125 may be a general-purpose computer (e.g., a desktop personal computer, a workstation, or a laptop computer running an data integrity application program) that is programmed to operate as a data integrity workstation, or a more special-purpose computer (e.g., a device specifically programmed to operate as a data integrity workstation).

An enterprise server 145 or 150 includes a data storage device 155 or 160. Each of the data storage devices 155 and 160 includes data 165 or 170 and executable instructions 175 or 180 for an enterprise application program 185 or 190. Data 165 or 170 for the enterprise application program 185 or 190 are stored so as to be logically organized as a series of objects. Each object is associated with a series of attributes, and each instance of an object may be associated with a series of attribute values. The object data in this implementation are stored in a relational database system. Data are stored physically in one or more relational database tables and organized logically as a series of objects. A relational database table is used to store data belonging to a particular object class, and each row in the relational database table represents an object instance. An object instance or a particular database row may be referred to as a data collection. Additionally, a data collection may include, for example, a data record, a data segment, or a collection of attribute values associated with a particular entity in an XML (Extensible Markup Language) document. XML is a language similar to hypertext markup language (HTML) but with the additional flexibility of being able to describe data structures that can be processed directly as data by a program.

In general, a user or system administrator for enterprise application program 185 may use the data integrity workstation 125 to compare data 165 associated with enterprise application program 185 with data 170 associated with enterprise application program 190. The results of the comparison indicate whether data are missing in data storage device 155 associated with enterprise application program 185 as compared with data in data storage device 160 associated with enterprise application program 190. The results of the comparison also indicate whether data are missing in data storage device 160 as compared with data in data storage device 155. In addition, the results indicate whether data found in both data storage device 155 and data storage device 160 have inconsistent data values.

More specifically, the determination whether data are present in one or both of the enterprise application programs 185 and 190 is based on identifying information for object instances. A duplicated object instance that represents the same entity may be identified based on object instance identifying information in enterprise application program 185 that matches object instance identifying information in enterprise application program 190. For example, a customer object instance in enterprise application program 185 and a customer object instance in enterprise application program 190 may have the same customer number. The customer object instance in enterprise application program 185 may be identified as representing the same customer entity as the customer object instance in enterprise application program 190 based on the customer number. An object instance that appears only in enterprise application program 185 may be identified when object instance identifying information in enterprise application program 185 does not match object instance identifying information in enterprise application program 190. Similarly, an object instance that appears only in enterprise application program 190 may be identified when object instance identifying information in enterprise application program 190 does not match object instance identifying information in enterprise application program 185. Object instance identifying information may be, for example, a key value, a global unique identifier, or another unique identifier for an object instance. The determination whether particular object instances are present in enterprise application program 185 and/or enterprise application program 190 may be referred to as presence detection or a header comparison. The phrase "header comparison" may be used, for example, when object instance identifying information is stored in a header for an object instance.

This presence detection allows identification of particular object instances that are missing from one of the enterprise application programs 185 or 190 and provides a user checkpoint that allows the user or system administrator to determine whether to compare the data values in the object instances. The checkpoint permits the user or system administrator to intervene in the detection process. For example, the user or system administrator may perform a presence detection to determine whether two data sets match before initiating the more complicated process to compare data values.

The data values in one or more attributes of a particular object instance are compared for an object instance that are stored by both enterprise application program 185 and enterprise application program 190. For example, a duplicate object instance that appears in both enterprise application programs 185 and 190 is identified. The data values in the object instance in enterprise application program 185 are compared with the data values in the object instance in enterprise application program 190 to determine whether the compared data values are the same. This may be referred to as an attribute value comparison, a data value comparison, or a detail comparison. Data values that are not identical or are otherwise inconsistent in the object instances are identified.

The detected inconsistencies in some cases also may be corrected. For example, based on an indication by a user or system administrator, a particular object instance that is missing from the enterprise application program 185 may be sent from enterprise application program 190 to the enterprise application program 185 where the particular object instance is stored in data 165. An object instance that is stored by both enterprise application program 185 and enterprise application program 190 may be corrected when the stored, corresponding object instances have different data values. For instance, the object instance stored in data 170 may be deleted and the corresponding object instance may be sent from enterprise application program 185 to the enterprise application program 190 and stored in data 170. Alternatively, one or more data values from the corresponding object instance may be sent from enterprise application program 185 to enterprise application program 190 and the data values in the object instance stored in data 170 may be updated.

Figure 2:
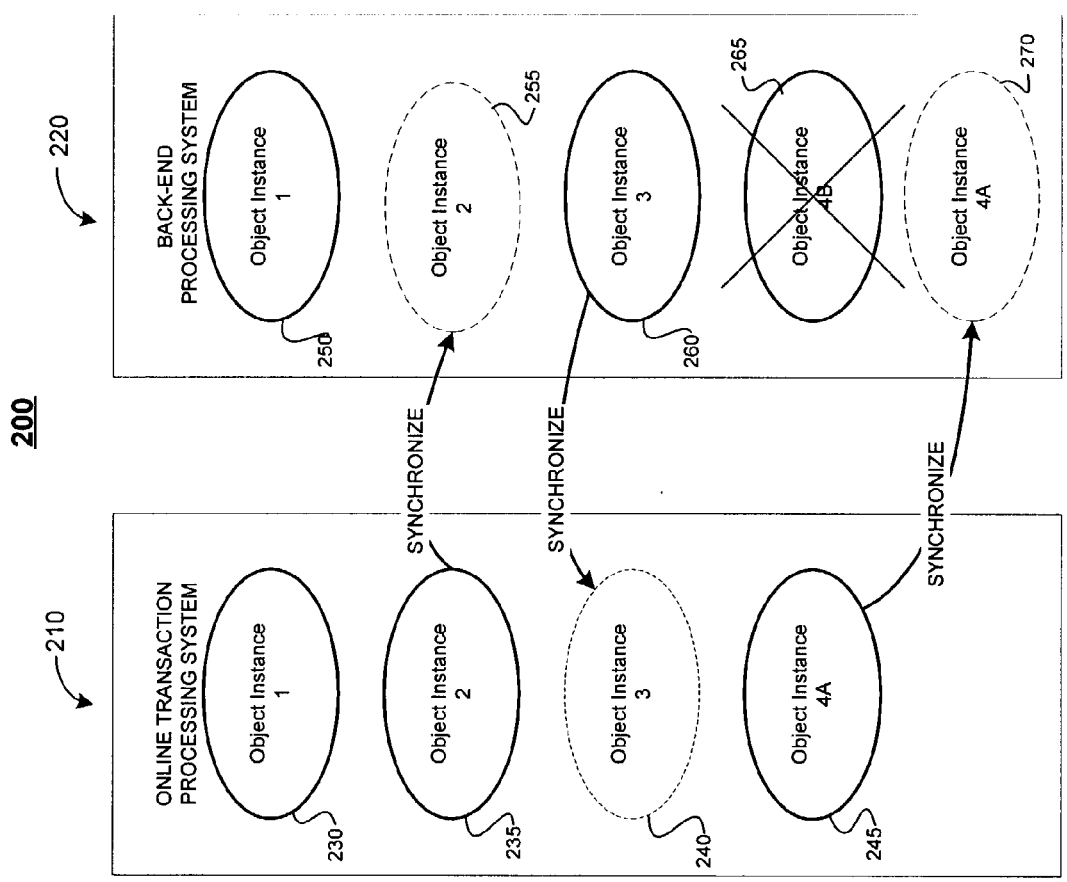
FIG. 2 is a diagram illustrating the results of managing data integrity in two or more data management systems.

FIG. 2 shows the results 200 of a process for managing data integrity in data management systems 210 and 220, which may constitute components of enterprise application programs 185 and 190. The data management system 210 or 220 may be a relational database management system, an object-oriented database management system, another type of database management system, or another set of software programs that manages the organization, storage, and retrieval of data. Data management system 210 includes object instances 230, 235, 240, and 245 for an online transaction processing system, and data management system 220 includes object instances 250, 255, 260, 265, and 270 for a back-end processing system.

Object instance 230 in data management system 210 and object instance 250 in data management system 220 both represent an "object instance 1". Both object instance 230 and object instance 250 were present in the respective data management system 210 or 220 when the presence detection was performed, as indicated by the solid lines around the object instances.

Object instance 235 in data management system 210 and object instance 255 in data management system 220 both represent an "object instance 2". The "object instance 2" was present only in data management system 210 (shown as object instance 235) when the presence detection was performed. Based on an indication by a user or a system administrator, object instance 235 was sent to data management system 220 for storage as object instance 255. This is indicated in FIG. 2 by the arrow and the dotted line around the object instance 255.

Similarly, object instance 240 in data management system 210 and object instance 260 in data management system 220 both represent an "object instance 3". The "object instance 3" was present only in data management system 220 (shown as object instance 260) when the presence detection was performed. To correct the data inconsistency, object instance 260 was sent to data management system 210 for storage as object instance 240 based on the indication by a user or a system administrator.

Object instance 245 in data management system 210 and object instances 265 and 270 in data management system 220 represent an "object instance 4". Object instances 245 and 270 represent "object instance 4A" that has one set of attribute values, and object instance 265 represents "object instance 4B" that has a different set of attribute values. The "object instance 4" was present in both data management systems and the data values for the "object instance 4" were inconsistent across the two data management systems when the attribute value comparison was performed. To correct the inconsistency in data values for the "object instance 4", object instance 265 was deleted from data management system 220 and object instance 245 was sent to data management system 220 for storage as object instance 270.

Figure 3:
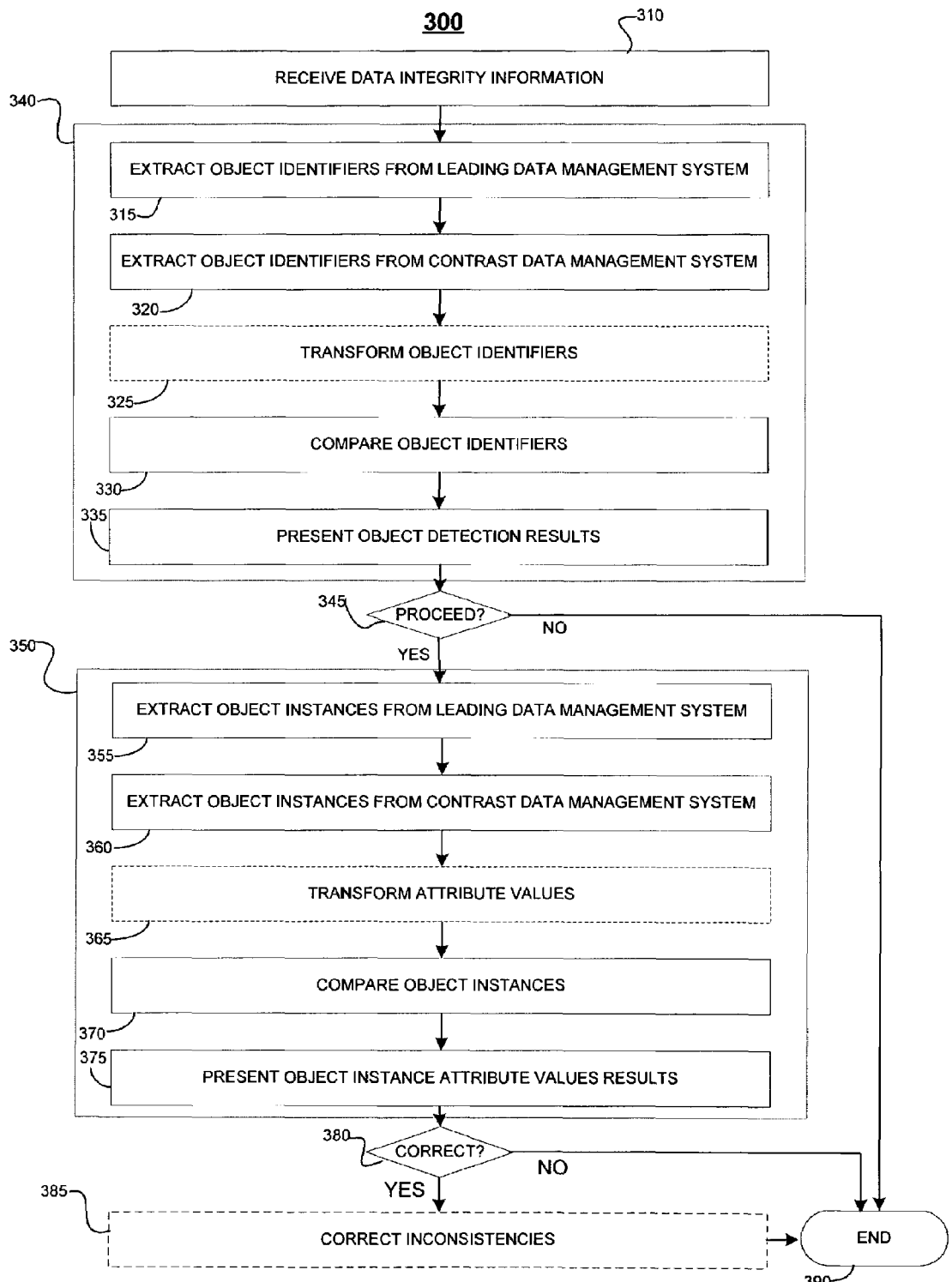
FIG. 3 is a flow chart of a process for managing data integrity in two or more data management systems.

FIG. 3 shows a process 300 for managing data integrity in two or more data management systems. The process 300 is a more specific example of a data integrity process, such as the data integrity process described in the previous discussion accompanying FIG. 1. The process 300 begins when a processor, such as a processor within data integrity workstation 125 in FIG. 1, receives data integrity information that defines the comparison to be performed (step 310). The data integrity information to be used for the process 300 is defined by a user or system administrator. The received data integrity information may be received from the user or system administrator. Additionally or alternatively, the received data integrity information may be received from persistent or transient storage, such as when the data integrity information is defined by a user and stored for access by the process 300. The received data integrity information includes the designation of one of the identified data management systems as the leading data management system and the other as the contrast data management system. The leading data management system may perform the specific comparison logic used for particular types of objects or data from particular enterprise application programs. The leading data management system also may store the comparison results. The contrast data management system refers to the data management system that is not the leading data management system. The data integrity information also may include, for example, the type of object to be compared in the two data management systems that use the object and for which the comparison is to be performed, and the criteria (which may be referred to as filter criteria) to be used to identify the group of object instances to be compared.

For all object instances in the leading data management system that meet the filter criteria for the comparison, the processor extracts an object identifier, such as a key or another identifier that uniquely identifies a particular object instance (step 315). The object identifiers extracted from the leading data management system may be stored in a comparison results table or list on the leading data management system or on a data integrity management workstation, such as workstation 125 in FIG. 1. When the data for the leading data management system is stored on a computer system other than the computer system on which the comparison results are stored, the processor may extract the object identifiers in a series of groups of object identifiers (such as a query set).

The processor then extracts the object identifiers for all object instances in the contrast data management system that meet the filter criteria for the comparison (step 320). The object identifiers may be extracted in a series of groups of object identifiers (such as a query set). This may be particularly beneficial when the contrast data management system is physically located on a computer system other than the computer system on which the leading data management system is located.

Optionally, the processor transforms the object identifiers extracted from the leading data management system and/or the contrast data management system for the comparison (step 325). A transformation may be required, for instance, when the object identifiers are stored in a different data format on the two data management systems or when different types of identifiers are used for the object instances stored on the two data management systems. For example, the contrast data management system may use a key identifier to identify each object instance uniquely when compared to other object instances of the same object type, while the leading data management system uses a global unique identifier that identifies the object instance uniquely across all object types. The processor may transform the key identifier for each object instance from the contrast data management system to a global unique identifier so that each object instance may be compared. For example, the processor may transform the key identifier to a corresponding global unique identifier by using a table or list that stores the key identifiers for the object instances in the contrast data management system in association with global unique identifiers for the leading data management system. The processor may store the transformed object instance identifier in addition to or in lieu of the object instance identifier received from the data management system.

Figure 6:
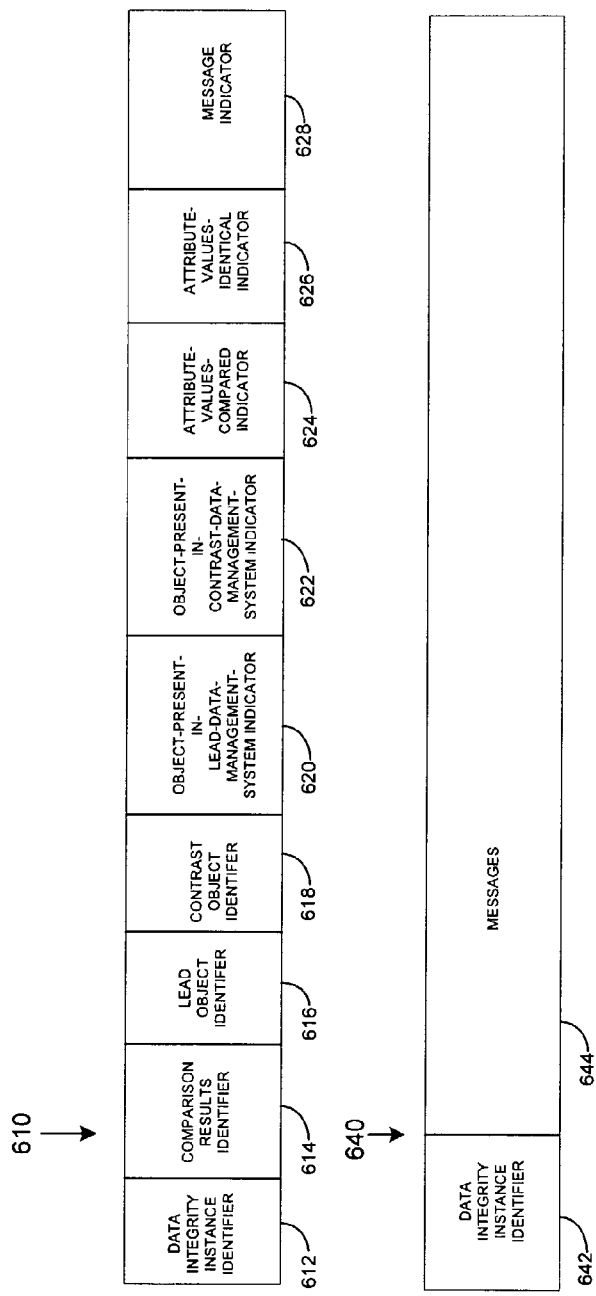

The processor then compares the object instance identifiers from the leading data management system with the object instance identifiers from the contrast data management system to determine which object instance identifiers are identical (step 330). Each object identifier extracted from the leading data management system and the corresponding contrast data management system, if any, is stored in a results table or list. An example data structure for such a results table is shown in FIG. 6 and will be described later.

Figure 8:
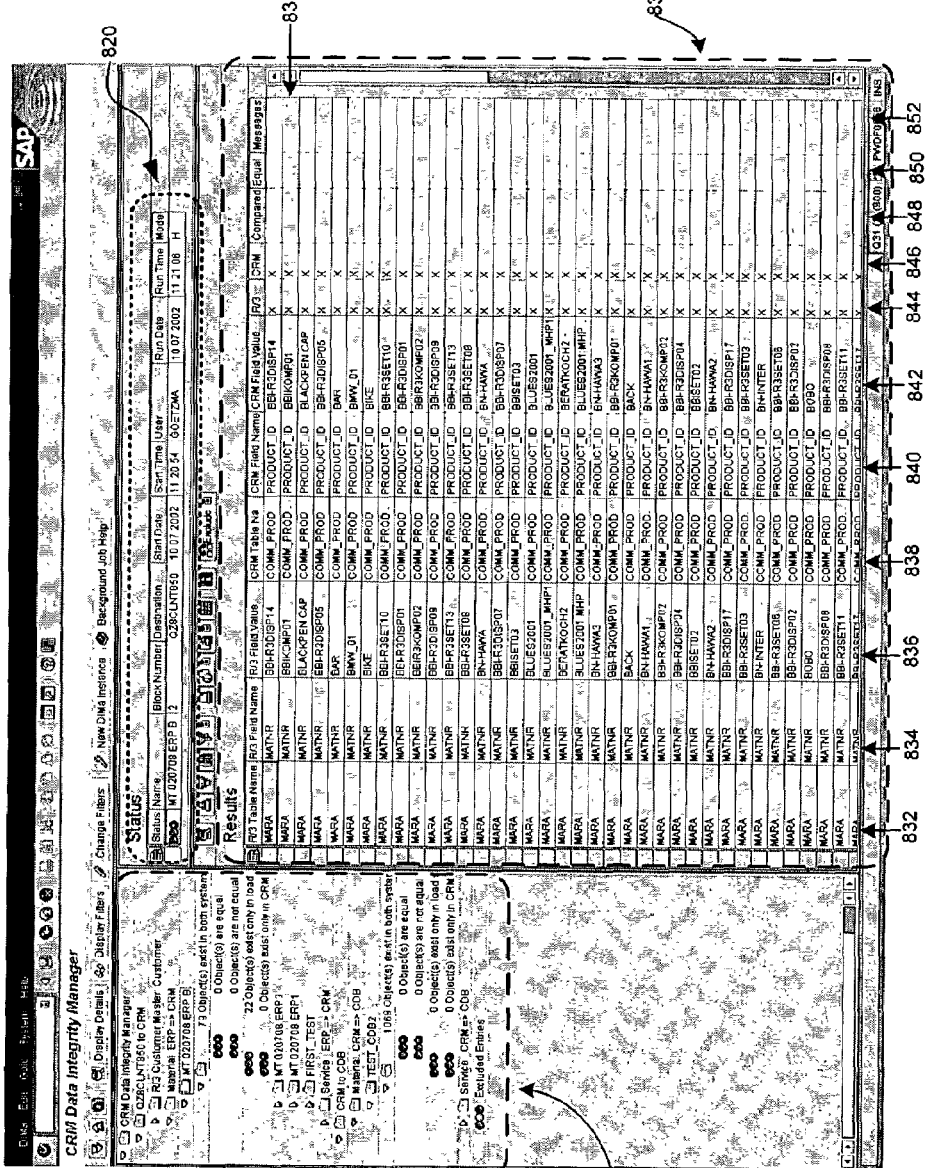

The processor then presents the results of the object instance identifier comparison, which may be referred to as object detection results (step 335). For example, a unique list of all object instance identifiers that are detected in one or both data management systems may be presented with an indication of whether the object instance occurs in the leading data management system and/or the contrast data management system. A screen capture for an example presentation of results is shown in FIG. 8. Steps 315–335 may be referred to as an presence detection sub-process 340.

The user or system administrator may determine whether to proceed with the process 300 after reviewing the presented results (step 345). This provides a user checkpoint that may improve the efficiency of the data integrity process, such as, through the elimination of one or more unnecessary data value comparisons. An unnecessary data value comparison may be eliminated, for example, when a user or system administrator uses the presence detection to examine the loaded data and determines that the majority of the data was not loaded before initiating the more complicated data value comparison. The user or system administrator may determine that a problem has occurred during the data load process based on the number of object instances loaded as compared with the number of object instances in the data management system that provided the data and decide not to proceed with the more complicated data value comparison.

When the user or system administrator determines to proceed with sub-process 350, the processor then performs similar steps for comparing the object instance values for object instances found in both the leading and contrast data management systems. The processor extracts the object instances that meet the filter criteria for the comparison from the leading data management system (step 355) and the contrast data management system (step 360). The processor may extract the object instances in a series of groups of object identifiers (such as a query set) for one or both of the extractions.

The processor may transform any attribute values as required to perform the object instance comparison (step 365). For example, the leading data management system may store a particular indicator attribute using "Y" for yes or "N" for no, while the contrast data management system may store the particular indicator attribute as "1" for yes and "0" for no. The processor transforms the "1" to "Y" and the "0" to "N" so that the data may be compared across the two data management systems. Alternatively, the comparison process that is used to compare the object values in step 365 may not require such a transformation and may compare the different formats, such as "1" with "Y" and "0" with "N".

The processor compares the attribute values for each object instance that are found in both data management systems to determine whether the attributes values in the object instance are the same (step 370). An attribute-by-attribute comparison is performed in which each attribute value in a particular object instance from the leading data management system is compared to the corresponding attribute value in the corresponding object instance from the contrast data management system. The processor may determine, for example, that a particular object instance from the leading data management system corresponds to a particular object instance in the contrast data management system based on matching object identifiers. Some or all of the attributes for a particular object type may be included in the comparison.

The processor then presents the object instance attribute values results (step 375). For example, the processor may indicate whether a particular object instance was compared and whether the values of the compared object instance were identical. An example data structure for the results is illustrated in FIG. 6, and FIG. 8 presents an example screen capture for presenting comparison results. The user or system administrator may determine whether to correct inconsistencies after reviewing the presented results (step 380). Alternatively or additionally, the user or system admininstrator may determine whether to correct inconsistencies after reviewing the object detection results in step 335.

Based on an indication by the user or system administrator, the processor corrects particular inconsistencies (step 385). For example, the particular object instances that are missing from one data management system may be sent from the data management system in which the object instances are found to the other data management system. Additionally or alternatively, a particular object instance in one data management system may be replaced by a corresponding object instance from the other data management system to correct one or more inconsistencies in the attribute values of a particular corresponding object instance. Some implementations may correct data inconsistencies by deleting one or more object instances. This may be accomplished, for example, by sending a message requesting the deletion of one or more object instances to a data management system Some implementations may use other software engineering techniques to correct data value inconsistencies, such as sending a object instance identifier and only the object attributes and associated values that need to be modified in the other system (rather than resending the entire object instance with all object attributes values in the object instance). When the user or system administrator decides not to proceed with sub-process 345 after viewing the results of object detection comparison sub-process 340 (step 345), the process ends (step 390). Similarly, when the user or system administrator decides not to correct inconsistencies (step 385), the process ends (step 390).

Figure 4:
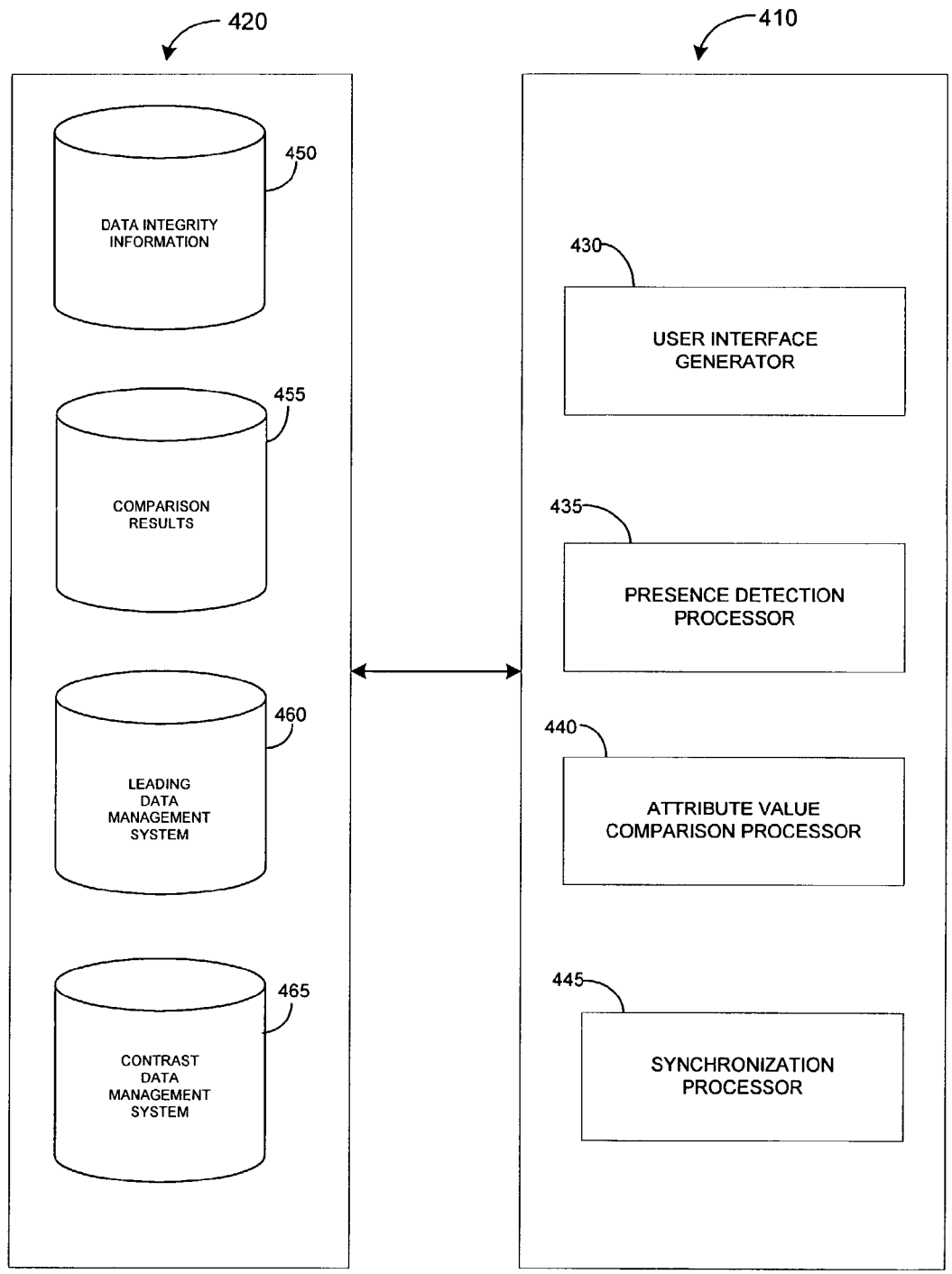
FIG. 4 is a diagram of the components of a software architecture for managing data integrity in two or more data management systems.

FIG. 4 depicts the components of a software architecture 400 for managing data integrity in two or more data management systems. The software architecture 400 has a data integrity processing component 410 and data components 420 used by the processing component 410. The data integrity processing component 410 includes a user interface generator 430, an presence detection processor 435, an attribute value comparison processor 440, and a synchronization processor 445. Data components 420 include data integrity information 450, comparison results 455, the leading data management system 460, and at least one contrast data management system 465. The software architecture may be implemented on components in system 100 involved in managing data integrity. For example, the data integrity processing component 410 may be implemented as executable instructions 175 on data storage device 155 associated with computer system 110. Data integrity processing component 410 also may be implemented as executable instructions stored on workstation 125. Data components 420 may include, for example, data 165 associated with computer system 110 and data 170 associated with computer system. Data components 420 also may include data stored on workstation 125.

Figure 5:
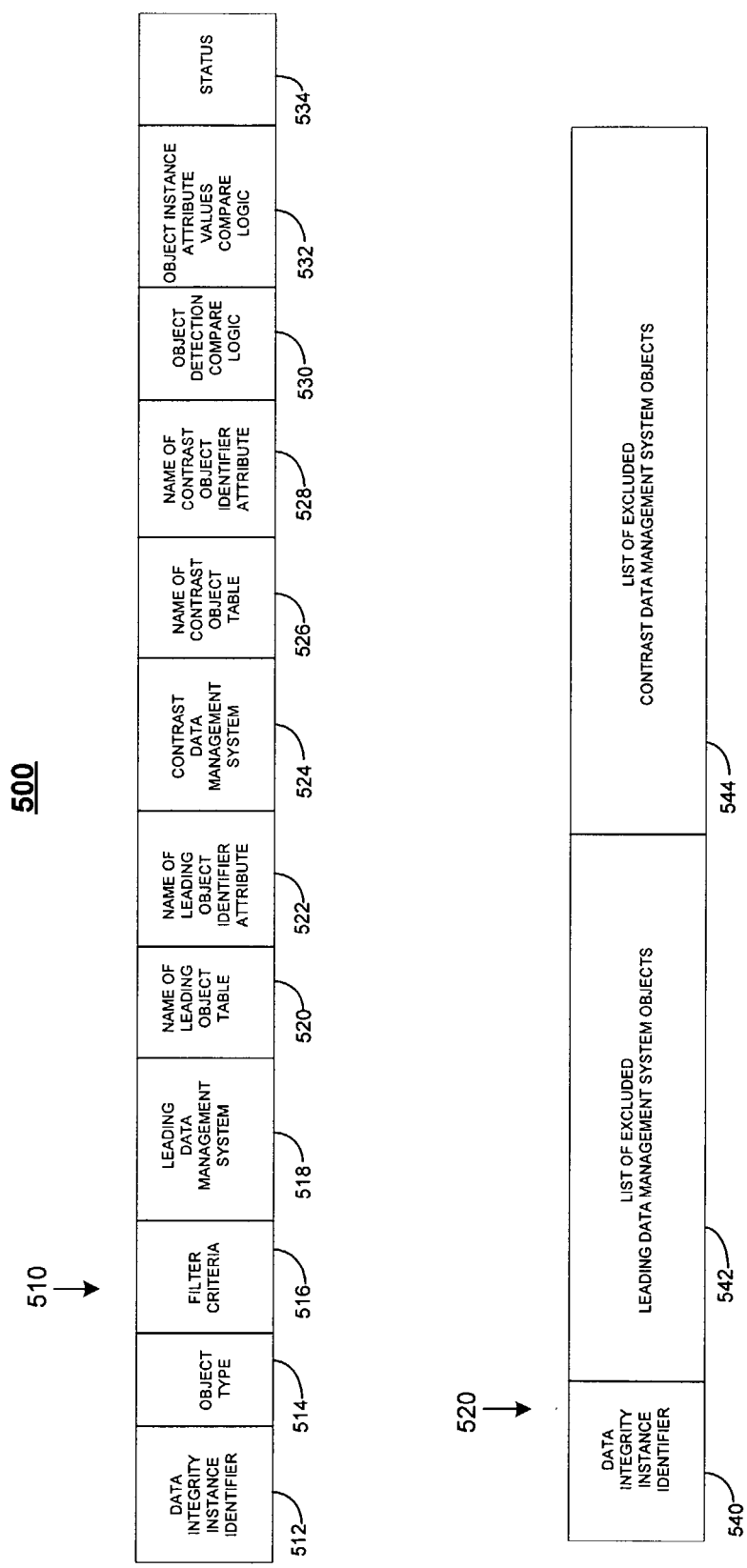
FIGS. 5 and 6 are block diagrams of example data structures used in managing data integrity in two or more data management systems.

The user interface generator 430 presents a user interface that may be used by a user to define the type of comparison that is to be performed. For example, the user may identify a object type from a list of predetermined object types for which a comparison may be performed. The user may identify the two or more data management systems to be used for comparison, such as by selecting from a predetermined list of data management systems that contain the object type identified, and may indicate which data management system is to be used as the leading data management system. The user may identify the filter criteria, if any, to be used to select the set of particular object instances to be compared. For example, for a sales order object type, object instances of sales orders from a particular time period (such as a quarter or a year) or particular geographical region may be included in the data integrity process. This may permit a user to define a series of data integrity instances that use mutually exclusive filter criteria. The data integrity instances may be executed at or about the same time. This may reduce the amount of time required to manage data integrity, particularly when each data integrity instance is executed by a separate processor in parallel with the execution of other data integrity instances. Additionally or alternatively, the user may indicate whether a presence detection and/or an attribute value comparison is to be performed and other operational constraints, such as when the comparison should be performed (e.g., during off-peak hours of computer system operation). In some implementations a user or system administrator may define what type of database operation (e.g., insert, update, and/or delete) may be performed on a particular object type to correct data inconsistencies. The information entered through the user interface is stored in data integrity information 450. An example data structure for data integrity information is shown in FIG. 5, and an example user interface for data integrity information is presented in FIG. 7.

The presence detection processor 435 uses the comparison definition stored in data integrity information 450, data stored in the leading data management system 460, and data stored in the contrast data management system 465 to extract the object identifiers from the data management systems included in the comparison. The processor 435 then optionally transforms the object identifiers and compares the object identifiers to determine which object instances are present in which of the data management systems, as described with respect to steps 315–330 of FIG. 3. The object detection processor 435 stores results of the presence detection in comparison results 455. The user interface generator 430 presents the presence detection results from comparison results 455. An example user interface for results is illustrated in FIG. 8.

Similarly, the attribute value comparison processor 440 uses the comparison parameters stored in the data integrity information 450, data stored in the leading data management system 460, and data stored in the contrast data management system 465 to extract the attribute values for the object instances in at least two data management systems included in the comparison. The processor 440 then optionally transforms the extracted attribute values and compares the corresponding attribute values in an attribute-by-attribute (or stepwise) manner, as described with respect to steps 350–365 of FIG. 3. The attribute value comparison processor 440 stores the results of the attribute value comparison in comparison results 455. The user interface generator 430 presents the attribute value comparison results from comparison results 455. An example user interface for presenting results is illustrated in FIG. 8.

The synchronization processor 445 uses data stored in the leading data management system 460 and data stored in the contrast data management system 465 to correct detected inconsistencies between the data management systems 460 and 465. The synchronization processor 445 may correct missing data by sending an object instance from the data management system in which the instance occurs to the data management system in which the instance does not occur, as described with respect to step 385 of FIG. 3.

FIG. 5 shows an example data structure 500 for data integrity information, such as data integrity information described with respect to step 310 of FIG. 3 or data integrity information 450 described with respect to FIG. 4. Data structure 500 includes a component 510 having a data integrity instance identifier 512, an object type 514, filter criteria 516, a leading data management system indicator 518, a leading object table name 520, a leading object identifier attribute name 522, a contrast data management system indicator 524, a contrast object table name 526, a contrast object identifier attribute name 528, an object detection compare logic name 530, an attribute values compare logic name 532, and a status indicator 534.

The data integrity instance identifier 512 uniquely identifies the particular data integrity instance. The object type 514 identifies the type of object for which the comparison is performed. For example, an object type may refer to a master object class that represents a principal entity, such as an employee, a customer, a business partner, or a product, stored in an enterprise application system. In some cases, the object type may identify the type of message format used to send the object instance data between the identified data management systems. The filter criteria 516 includes the criteria that a particular object instance must meet to be included in the comparison process. For example, for an employee object type, the filter criteria may indicate that only employee object instances that have employee identification numbers in a particular specified range are to be included in the comparison.

The leading data management system indicator 518 identifies a data management system that includes the object type and is to be used as the system that is compared to the contrast data management systems. The leading object table name 520 identifies the table in the leading data management system that stores the type of object that is compared. The leading object identifier attribute name 522 identifies the attribute in the leading object table that is to be used as the object instance identifier for presence detection.

Similarly, the contrast data management system indicator 524 identifies the contrast data management system for which data is to be compared with the leading data management system identified by leading data management system indicator 518. The contrast object table name 526 identifies the table in the contrast data management system that stores the type of object that is compared, and the contrast object identifier attribute name 528 identifies the attribute in the contrast object table that is to be used as the object instance identifier for presence detection.

The object detection compare logic name 530 identifies the object-specific application program or other set of executable instructions to be used in comparing the object instance identifiers in the leading and contrast data management systems. Similarly, the attribute values compare logic name 532 identifies the object-specific application program or other set of executable instructions to be used in comparing the object instance identifiers in the leading and contrast data management systems.

The status indicator 534 shows the status of the data comparison (e.g., the presence detection or the attribute value comparison) that is associated with the data integrity instance. In the example illustrated by FIG. 5, the possible status states are that the data comparison is waiting to be performed, the data comparison is being performed, the data comparison is completed, or the data comparison has been aborted.

Data structure 500 also includes a component 520 having a data integrity instance identifier 540, a list 542 of the object instances in the leading data management system that are to be excluded from the comparison performed for the data integrity instance identified by the data integrity instance identifier 540 and a list 544 of the object instances in the contrast data management system that are to be excluded. The data integrity process, such as described previously with respect to FIGS. 1–4, will not extract or compare any object instances that are identified by list 542 or 544 even when a particular instance meets the filter criteria 516. In the example illustrated by FIG. 5, data component 510 is stored in one table and data component 520 is stored in another table.

FIG. 6 shows an example data structure 600 for the results information produced for a particular object instance by the performing the comparisons indicated by a particular data integrity instance. Examples of the results information have been described previously with respect to FIG. 3 and with respect to comparison results 455 in FIG. 4.

Data structure 600 includes a component 610 having a data integrity instance identifier 612, a comparison results identifier 614, a leading object identifier 616, a contrast object identifier 618, and indicators 620, 622, 624, 626, and 628. The data integrity instance identifier 612 uniquely identifies the particular data integrity instance to which the comparison results information relates. Typically, there is an instance of data component 610 for each unique object instance found for a particular data integrity instance. The comparison results identifier 614 uniquely identifies the object instance found for a particular data integrity instance. The leading object identifier 616 identifies a particular lead object instance, and a contract object identifier 618 identifies a particular contrast object identifier that corresponds to the unique object instance that was identified in the presence detection.

The indicator 620 shows whether the object instance was present in leading data management system, and the indicator 622 shows whether the object instance was present in the contrast data management system. The indicator 624 shows whether the data values have been compared for an object instance that is found in both the leading data management system and the contrast data management system. The indicator 626 shows whether the attribute value in the object instance in the leading data management system corresponding to the object instance identified by the lead object identifier 616 is the same as the object instance in the contrast data management system corresponding to the object instance identified by the contrast object identifier 618. The indicator 628 shows whether one or more messages exist for the object instance for which the results apply.

Data structure 600 also includes a component 640 having a comparison result identifier 642 and a list 644 of messages. The comparison result identifier 612 uniquely identifies the results for a particular data integrity instance. The list 614 of messages indicates the one or more messages that apply to the comparison result identified and are presented with the results, as illustrated by FIG. 8.

Figure 7:
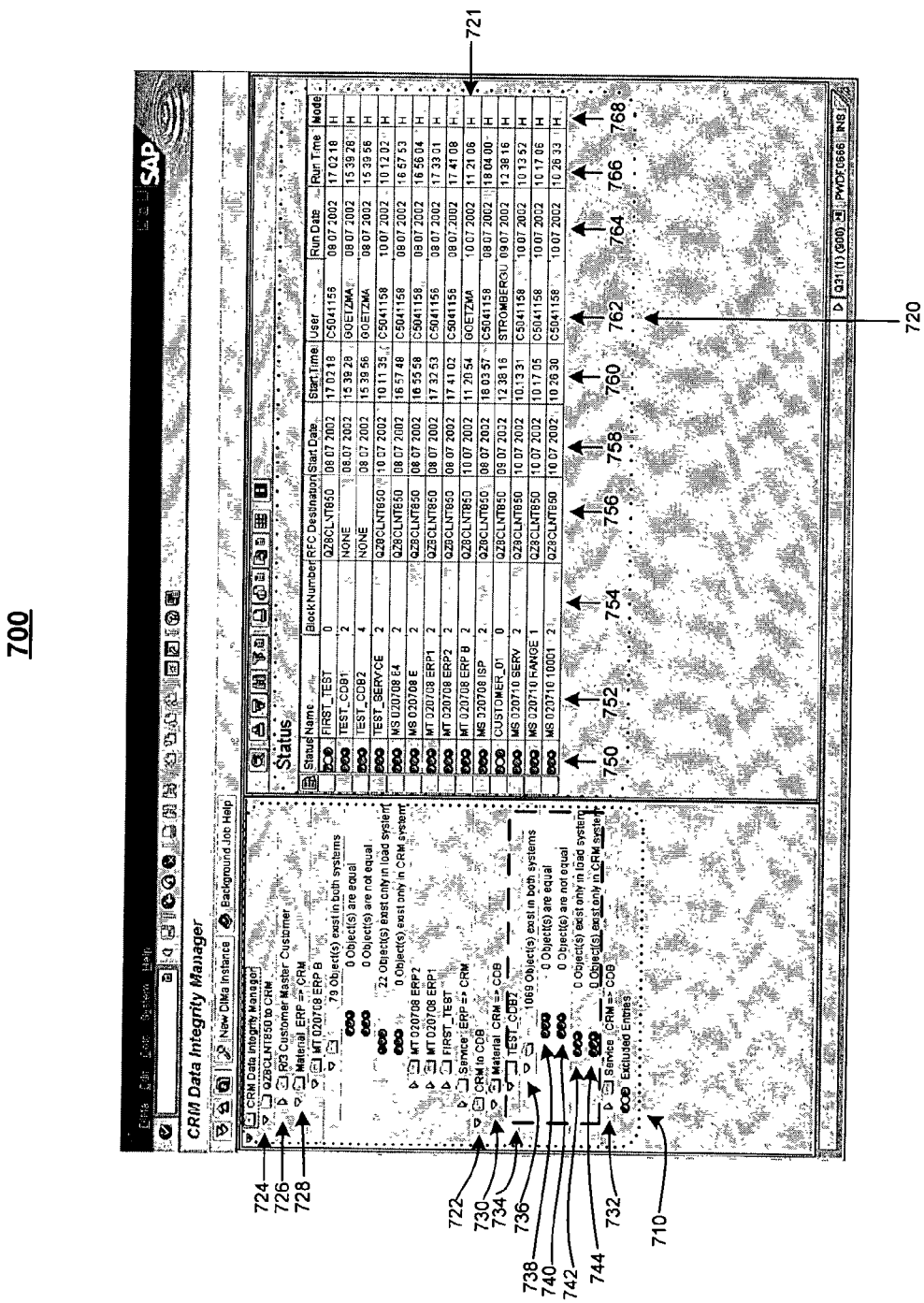
FIGS. 7 and 8 are screen captures that may appear on a computer used in the data integrity management process.

FIG. 7 illustrates an example of a user interface 700 for managing data integrity. In the implementation illustrated by FIGS. 7 and 8, the data management system uses relational tables to arrange data associated with an object instance in a series of columns and rows. Each column describes an attribute of the object instance for which data is being stored and may be referred to as a field. Each row represents a collection of attribute values for a particular object instance and is referred to as a record or an object instance.

The user interface 700 provides a user checkpoint that allows a user or system administrator to determine whether to proceed with the data value comparison as described previously with respect to FIGS. 1 and 3. The user interface 700 has a navigation tree 710 and a status display 720. The navigation tree 710 permits users to select a combination of two data management systems for which a data integrity instance (which also may be referred as a data compare) exists and select a particular data integrity instance with which to work.

Data management system combination 722 groups the series of data integrity instances that compares the data stored in a customer relationship management system identified as "CRM" and another data management system identified as "CDB". The "CDB" data management system stores a consolidated database that is used by the customer relationship management system. Similarly, data management system combination 724 groups the data integrity instances that compares the data stored in a data management system identified as "QZ8CLNT850" and the "CRM" data management system. The data management system identified as "QZ8CLNT850" is used by a back-end processing system that processes data received from the customer relationship management system.

The next level in the navigation tree 710 lists the object types 726, 728, 730, and 732 that can be compared in the data management systems identified by the previous hierarchical level in the navigation tree. For example, object type 726 indicates that customer object instances may be compared using data management system combination 724. Similarly, object type 728 indicates that material object instances (e.g., product materials) may be so compared. Object type 730 indicates that material object instances may be compared using data management system combination 722. Similarly, object type 732 indicates that service object instances may be so compared.

The next level in the navigation tree 710 shows the existing data integrity instances for each object type, as illustrated by data integrity instance 734. Data integrity instance 734 shows a summary of the results node indicating the number of object instances that exist in both systems 736, and, of those, the number of object instances which are equal 738 and the number which are not equal 740; the number of object instances 742 that exist only in the contrast data management system (here, called a load system); and the number of object instances 744 that exist only in the leading data management system (here, the CRM data management system).

The status display 720 lists the data integrity instances that are associated with the object type selected in the navigational tree. The status display 720 shown in FIG. 7 shows the status of the data integrity instances. Each row in status display, such as row 721, represents a particular data integrity instance. The information provided for each listed data integrity instance in the status display 720 includes a status indicator 750, a name 752 for the data integrity instance, a block number 754, a RFC destination 756, a start date 758, a start time 760, a user identifier 762, a run date 764, a run time 766, and a mode 768.

A status indicator 750 shows the status of the data integrity instance using a graphic depiction of three colored lights. A red light indicates that the data integrity instance is waiting to be run or a run has been aborted. A yellow light indicates that the comparison is running. A green light indicates that the comparison has been completed.

The name 752 for the data integrity instance is an alphanumeric name given at the time that data integrity instance was created to help a user identify a particular data integrity instance. The block number 754 indicates the number of blocks of data (e.g., sets of data) that have been processed. The RFC destination 756 indicates information particular to data management system QZ8CLNT850. Here, the RFC destination identifies the particular component of the data management system that is to be used during the comparison. Information identifying a particular component may be necessary when the several components of a data management system may be used for a data integrity process. The start date 758 and start time 760 indicate the date and time when the data integrity instance was started. The user identifier 762 identifies the user that started the data integrity instance. The run date 764 and run time 766 indicate the date and time when the current block of data completed processing. The mode 768 indicates the type of compare that was performed in the most recent comparison. A "H" indicates a "header" or object detection compare, and a "T" indicates a detail or object instance attribute value compare. When both a presence detection and an object instance attribute value comparison have been performed, the mode 768 value is "T", which indicates that the object instance attribute value comparison has been performed and the status information presented represents the object instance attribute value comparison.

The data structure 700 allows a user or system administrator to specify a start time for the comparison. This may allow a comparison, such as a complicated data value comparison, to be performed during off-peak hours for the leading data management system or other system that is used to perform the comparison.

FIG. 8 illustrates an example of a user interface 800 for managing data integrity. The user interface 800 has a navigation tree 810, a status display 820, and a results display 830. The user interface 800 may be accessed, for example, by identifying a data integrity instance displayed in a row in status display 720 in FIG. 7. Here, row 721 in FIG. 7 was identified by double-clicking a pointing device for user input (e.g., a mouse) to access the user interface 800. The tree navigation 810 is the same as tree navigation 710 in FIG. 7, and the status display 820 is the same information as displayed in the data integrity instance displayed in row 721 in FIG. 7. The results display 830 presents information about each object instance included in the data integrity instance identified in status display 820. Alternatively, user interface 800 may be accessed by identifying one of the summary results nodes displayed in the navigation tree 710, such as 736, 738, 740, 742, or 744. In such cases, the results display 830 presents information only about the object instances that match the subject matter of the nodes. For example, when node 738 in FIG. 7 that represents the number of object instances which are equal in both data management systems is identified, the results display 830 only presents the object instances that are equal in both data management systems.

Each row in the result display, such as row 831, represents a particular object instance for a data integrity instance and may be displayed, for example, from a data structure similar to data structure 600 described with respect to FIG. 6. The information provided for each listed object instance in the results display 830 identifies the object instances displayed in the contrast data management system (specifically, table name 832, field name 834, and field value 836) and the leading data management system (specifically, table name 838, field name 840 and value 842), a contrast data management system indicator 844, a leading data management system indicator 846, a compared indicator 848, an equal indicator 850, and a messages indicator 852.

The contrast data management system table name 832, field name 834, and field value 836 identify the attribute value and identifying information about the particular field compared from the contrast data management system. Similarly, leading data management system table name 838, field name 840 and value 842 identify the attribute value and identifying information about the particular field compared from the leading data management system. The contrast data management system indicator 844 and the leading data management system indicator 846 show whether the object instance was found in the respective data management system.

The compared indicator 848 and the equal indicator 850 only have values when a object instance attribute value comparison has been performed for the particular object instance. The compared indicator 848 shows whether an object instance attribute value comparison has been performed by displaying a value, such as an "X" (not shown), in the display to indicate that an object instance attribute value comparison has been performed. A blank indicator (as here) indicates that the object instance attribute value comparison has not been performed for the object instance. When an object instance attribute value comparison has been performed for the object instance, the equal indicator 850 indicates the results, such as displaying a "X" for equal to indicate that the attribute values compared are equal in the contrast data management system object instance identified by items 832, 834, and 836, and in the leading data management system instance identified by items 838, 840, and 842. Similarly, a blank would indicate that the object instances compared are not equal. The messages indicator 852 indicates whether any messages exist for the particular object instance.

Figure 9:
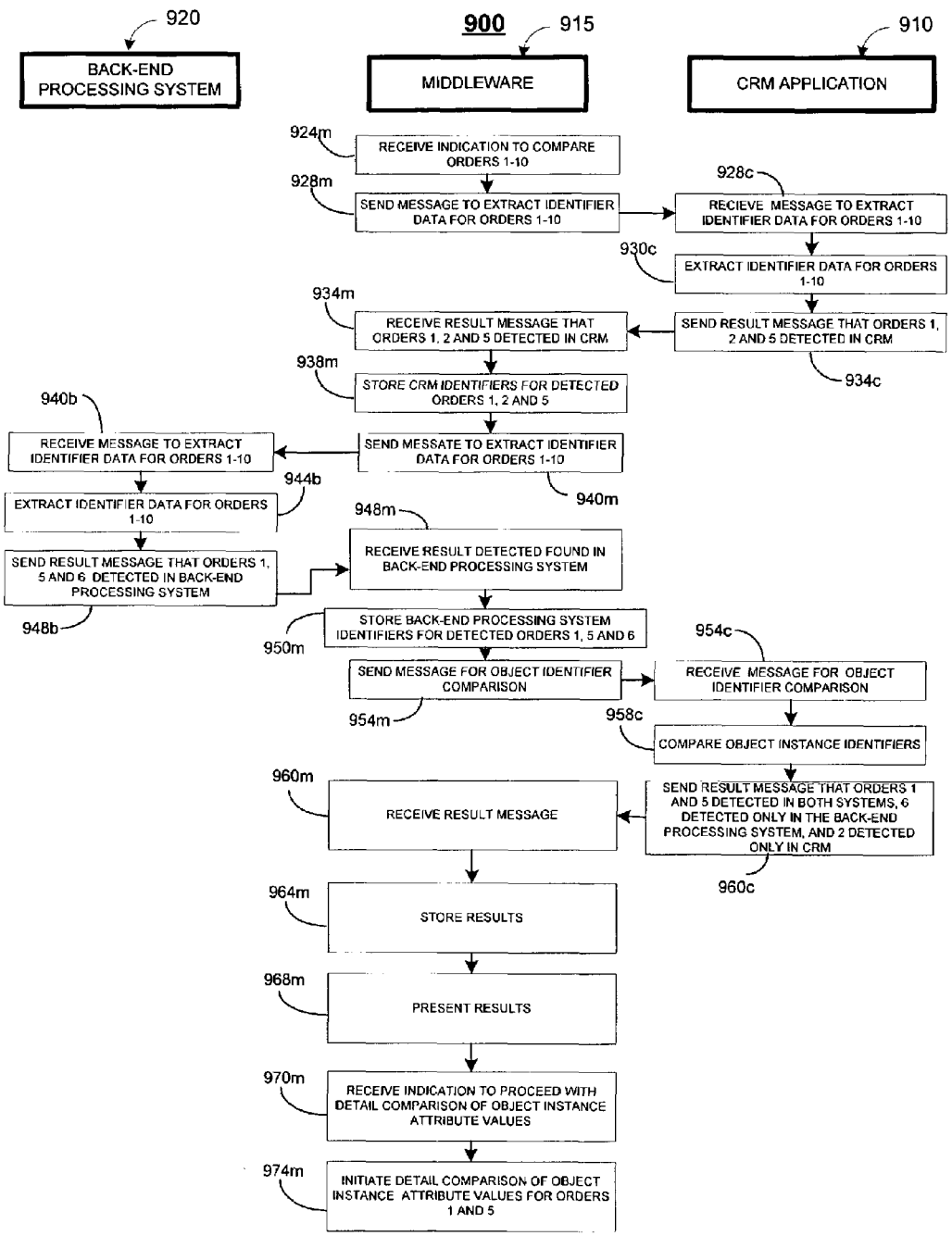
FIGS. 9 and 10 are block diagrams illustrating communications for managing data integrity in a customer relationship management system and a back-end processing system.
Figure 10:
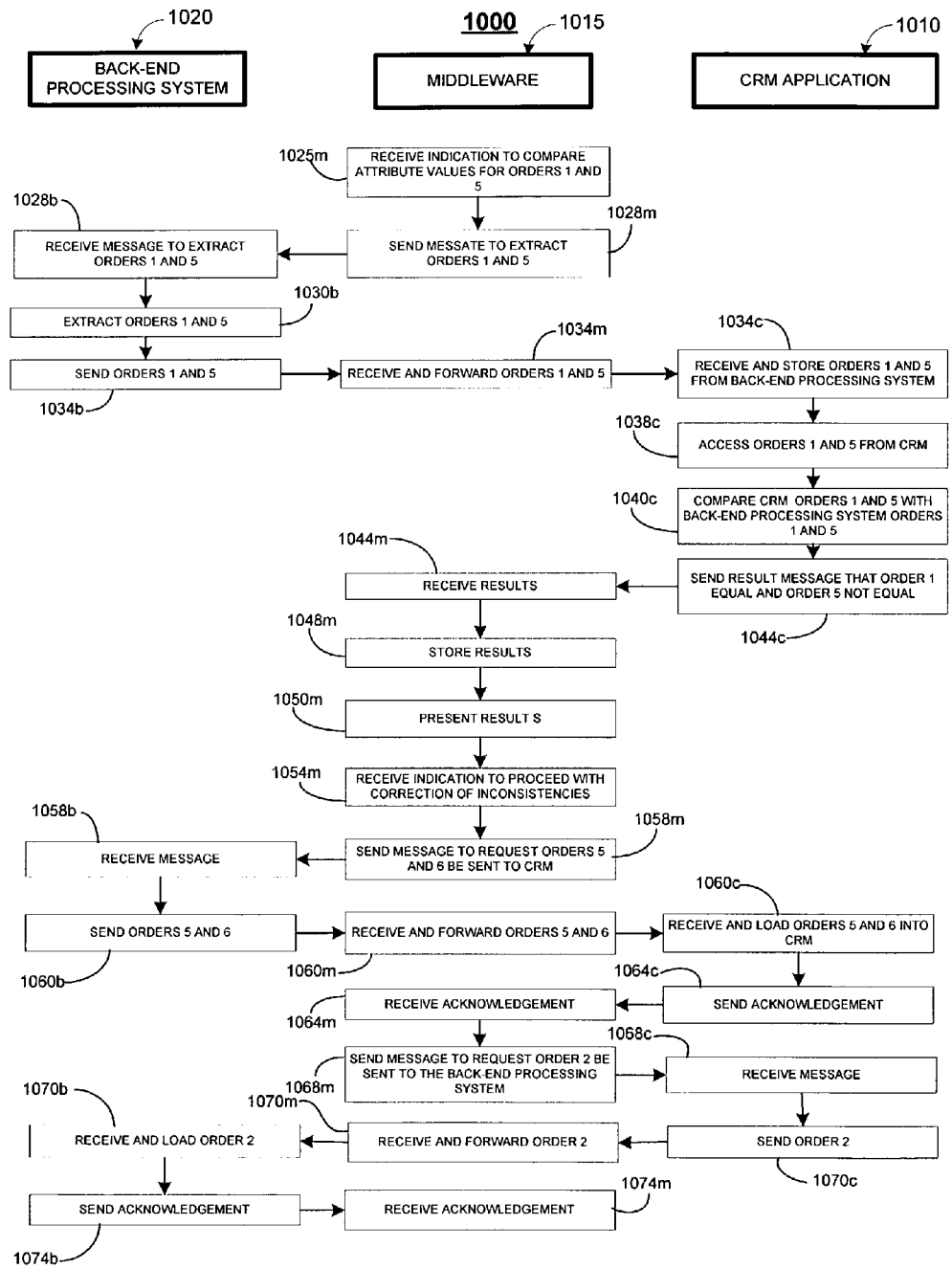

Referring to FIGS. 9 and 10, procedures 900 and 1000 may be used to manage data integrity in a customer relationship management (CRM) system and a back-end processing system. More specifically, data detection procedure 900 may be used to detect object instances that are in the CRM system and/or the back-end processing system. Data detection procedure 900 is an implementation similar to the implementation described in data integrity sub-process 340 in FIG. 3. Detail comparison procedure 1000 may be used to compare attribute values for each object instance found by data detection procedure 900 in both the customer relationship management system and the back-end processing system. Detail comparison procedure 1000 is an implementation similar to the implementation described in data integrity sub-process 350 in FIG. 3. Detail comparison procedure 1000 in this implementation also may include the correction of detected inconsistencies in the CRM system and the back-end processing system. The correction of detected inconsistencies in this implementation may be similar to the correction of inconsistencies described in step 385 in FIG. 3.

Data integrity procedure 900 involves a CRM application 910, middleware 915, and a back-end processing system 920. CRM application 910 and back-end processing system 920 each may be similar to or the same as enterprise application program 185 or 190 in FIG. 1. Similarly, the CRM application 910 and middleware 915 collectively may be similar to or the same as enterprise application program 185 or 190 in FIG. 1.

The CRM application 910 may be used, for example, by sales representatives to enter new customer information, prepare a bid for a customer, and enter a product order for a customer. A product order may be entered using an off-line client system (such as a laptop or a personal digital assistant) that periodically sends data modifications to a CRM centralized database or other type of centralized data repository. A product order entered through the CRM application 910 is processed and fulfilled using the back-end processing system 920. The product data stored by CRM application 910 and back-end processing system 920 should be consistent. The data detection procedure 900 and the detail comparison procedure 1000 may be used together to detect and correct inconsistencies in product data stored by the CRM application 910 and the back-end processing system 920.

Middleware 915 directs data exchange messages between the CRM application 910 and the back-end processing system 920. In this implementation, middleware 915 is a component of the CRM system and also directs data exchange messages between components of the CRM application 910. Middleware 915 in this implementation uses different types of message structures to communicate different types of data structures. For example, customer information is communicated using one type of data structure, and product order data is communicated using another type of data structure. Some implementations may use middleware that uses the same message structure for all types of data structures or may use different message structures based on the type of computer platform that is receiving the data exchange message (e.g., an XML document may be used to communicate with a web server hosting an application program and a proprietary format may be used when exchanging messages within components of the application server).

Middleware 915 also controls the data detection procedure 900. Middleware 915 sends data exchange messages to CRM application 910 and back-end processing system 920 to accomplish the data detection procedure 900.

The data detection procedure 900 begins when middleware 915 receives an indication from a user to compare product orders with order numbers equal to one to ten (step 924*m*), in a manner like or similar to the manner described in step 310 in FIG. 3. For example, the user may have initiated the processing of a particular data integrity instance that had been stored in a data integrity information data component, such as item 450 in FIG. 4. The data integrity instance identifies the CRM application 910 and the back-end processing system 920 as the systems for which the process is to be performed. The data integrity instance identifies the CRM application 910 as the leading data management system that performs the comparison process to detect the presence of object instances in the CRM application 910 and the back-end processing system 920. The data integrity instance also identifies a product order as the type of object instances for which the data integrity procedure is performed. The data integrity instance identifies the filter criterion as product order instances ("orders") with order numbers equal to one to ten. The data integrity instance may use a data structure like or similar to data structure 500 in FIG. 5.

Middleware 915 sends a message to the CRM application 910 to extract order instance identifier data for orders with order numbers equal to one to ten (step 928*m*). CRM application 910 receives the message (step 928*c*) and extracts order instance identifier data for orders with order numbers equal to one to ten (step 930*c*). This may be accomplished in a manner like or similar to step 315 in FIG. 3. Here, orders were detected with order numbers equal to 1, 2 and 5 in the CRM application 910. The CRM application 910 sends a result message to middleware 915 that orders 1, 2, and 5 were detected (step 934*c*). The result message includes the order instance identifier data for the detected orders. Middleware 915 receives the result message (step 934*m*) and stores the order instance identifier data for the detected orders (step 938*m*). The results table may be like or similar to comparison results 455 in FIG. 4, and may use a data structure similar to data structure 600 in FIG. 6. In this implementation, the CRM application 910 and the back-end processing system 920 use the same order instance identifier (e.g., order number) to identify orders. The results table may be like or similar to comparison results 455 in FIG. 4, and may use a data structure like or similar to data structure 600 in FIG. 6. Middleware 915 sends a message to the back-end processing system 920 to extract order instance identifier data for orders with order numbers equal to one to ten (step 940*m*). Back-end processing system 920 receives the message (step 940*b*) and extracts order instance identifier data for orders with order numbers equal to one to ten (step 944*b*). This may be accomplished in a manner like or similar to step 320 in FIG. 3. Here, orders were detected with order numbers equal to 1, 5 and 6 in the back-end processing system 920. The back-end processing system 920 sends a result message to middleware 915 that orders 1, 5, and 6 have been detected (step 948*b*). The result message includes the order instance identifier data for the detected orders. Middleware 915 receives the result message (step 948*m*) and stores the order instance identifier data for the detected orders in the results table (step 950*m*).

Middleware 915 sends a message to the CRM application 910 to compare the order instance identifiers detected in the CRM application 910 and the back-end processing system 920 (step 954m). The CRM application 910 receives the message (step 954c) and compares the object instance identifiers (step 958c). The CRM application 910 identifies which object instance identifiers are detected in both the CRM application 910 and back-end processing system 920. The CRM application 910 identifies which object instance identifiers are detected only in the back-end processing system 920 and which object instance identifiers are detected only in the CRM application 910. The CRM application 910 sends a result message to the middleware 915 with the comparison results (step 960c). Here, the CRM application 910 sends a message that orders 1 and 5 have been detected in both systems, order 6 has been detected only in the back-end processing system 920, and order 2 has been detected only in the CRM application 910.

Middleware 915 receives the result message sent by the CRM application 910 (step 960m) and stores the results in the results table (step 964m). The results table is partially depicted below.

| Order object instance identifier | Detected in CRM application 910 | Detected in back-end processing system 920 | Attribute values compared? | Attribute values identical? |
|---|---|---|---|---|
| 1 | Y | Y | N | |
| 2 | Y | N | N | |
| 5 | Y | Y | N | |
| 6 | N | Y | N | |

Middleware 915 presents the data detection results (step 968m). This may be accomplished in a manner like or similar to step 335 in FIG. 3 or user interface 800 in FIG. 8. For example, middleware 915 may present that orders 1 and 5 were detected in both systems, order 2 was detected only in CRM application 910, and order 6 was detected only in back-end processing system 920.

Middleware 915 receives an indication from the user to proceed with a detail comparison of object instance attribute values (step 970m). This may be accomplished in a manner like or similar to step 345 in FIG. 3. Middleware 915 initiates the detail comparison of the orders 1 and 5 that were detected in both systems (step 974m). This may be accomplished by the initiation of the detail comparison procedure 1000 that is described below with respect to FIG. 10.

Referring to FIG. 10, detail comparison procedure 1000 involves a CRM application 1010, middleware 1015, and a back-end processing system 1020. In this implementation, the CRM application 1010 is the same as CRM application 910 of FIG. 9. Similarly, middleware 1015 is the same as middleware 915 of FIG. 9, and back-end processing system 1020 is the same as back-end processing system 920 of FIG. 9.

The data detection procedure 1000 begins when middleware 1015 receives an indication from a user to compare the attribute values of the orders 1 and 5 that have been detected in both the back-end processing system 1020 and the CRM application 1010 (step 1025m). This may be accomplished in a manner like or similar to the manner described in step 310 in FIG. 3 or step 974m in FIG. 9.

Middleware 1015 sends a message to the back-end processing system 1020 to extract the data for orders 1 and 5 (step 1028m). Back-end processing system 1020 receives the message (1028b) and extracts the orders 1 and 5 (step 1030b). Back-end processing system 1020 sends orders 1 and 5 to middleware 1015 (step 1034b). Steps 1030b and 1034b may be accomplished in a manner like or similar to step 360 in FIG. 3. For example, sending the extracted order data may be accomplished by sending the orders in a series of groups of orders (e.g., data may be sent in a blockwise manner). When large amounts of data are exchanged, sending the data in a series of groups may be advantageous.

Middleware 1015 receives the orders 1 and 5 and forwards the orders 1 and 5 on to the CRM application 1010 (step 1034m). CRM application 1010 receives and stores orders 1 and 5 from the back-end processing system 1020 (step 1034c). The order data is stored in a temporary data table that is used to perform the detail comparison in step 1040c described below. CRM application 1010 accesses orders 1 and 5 from the CRM application 1010 (step 1038c). The CRM application 1010 compares the attribute values in orders 1 and 5 (step 1040c). Specifically, the CRM application 1010 compares each attribute value in the order 1 received from the back-end processing system 1020 with each corresponding attribute value in order 1 accessed from the CRM application 1010. The CRM application 1010 determines whether the attribute values in order 1 received from the back-end processing system 1020 are identical to the attribute values in order 1 accessed from the CRM application 1010. Similarly, the CRM application 1010 compares each attribute value in the order 5 received from the back-end processing system 1020 with each corresponding attribute value in order 5 accessed from the CRM application 1010. The CRM application 1010 determines whether the attribute values in the order 5 received from the back-end processing system 1020 are identical to the attribute values in the order 5 accessed from the CRM application 1010. In this implementation, all of the attribute values in the order instance are compared. In some implementations, only a subset of the attribute values in an object instance may be compared.

The CRM application 1010 sends a result message to middleware 1015 (step 1044c). Here, the result message indicates that the attribute values in the order 1 in the back-end processing system 1020 are equal to the attribute values in order 1 in the CRM application 1010. The result message also indicates that the attribute values in the order 5 in the back-end processing system 1020 are not equal to the attribute values in order 5 in the CRM application 1010.

The middleware 1015 receives the result message (step 1044m) and stores the results in the results table (step 1048m). The results table is partially depicted below.

| Order object instance identifier | Detected in CRM application 910 | Detected in back-end processing system 920 | Attribute values compared? | Attribute values identical? |
|---|---|---|---|---|
| 1 | Y | Y | Y | Y |
| 2 | Y | N | N | |
| 5 | Y | Y | Y | N |
| 6 | N | Y | N | |

Middleware 1015 presents the results (step 1050m). This may be accomplished in a manner like or similar to step 375 in FIG. 3 or user interface 800 in FIG. 8. For example, middleware 1015 may present that orders 1 and 5 have been compared, the attribute values of order 1 are identical in both the back-end processing system 1020 and the CRM application 1010, and the attribute values of order 5 are not identical in both systems.

Middleware 1015 receives from the user an indication to proceed with the correction of the detected inconsistencies (step 1054*m*). This may be accomplished in a manner like or similar to step 380 in FIG. 3. Middleware 1015 sends a message to the back-end processing system 1020 to request that order 5 and order 6 be sent to the CRM application 1010 (step 1058*m*). Middleware 1015 requests order 5 to correct the data integrity problem in which inconsistent attribute values had been detected in the order instances that were stored by the back-end processing system 1020 and the CRM application 1010. Middleware 1015 requests order 6 to correct the data integrity problem that order 6 had been detected only in the back-end processing system 1020.

The back-end processing system 1020 receives the message (step 1058*b*) and sends orders 5 and 6 to middleware 1015 (step 1060*b*). Middleware 1015 receives and forwards orders 5 and 6 to the CRM application 1010 (step 1060*m*). CRM application 1010 receives order 5 and order 6 and loads orders 5 and 6 into the CRM application 1010 (step 1060*c*). The CRM application 1010 loads order 5 and order 6 in a way that orders 5 and 6 are consistent in the back-end processing system 1020 and the CRM application 1010. For example, the CRM application 1010 may delete the order 5 in the CRM application 1010 prior to the insertion of the order 5 from the back-end processing system 1020. Alternatively, the order 5 from the back-end processing system 1020 may be loaded with an associated time and data stamp that permits the order 5 from the back-end processing system 1020 to logically replace the order 5 originally in the CRM application 1010. The logical replacement may occur without the physical deletion of original order 5 in the CRM application 1010. Alternatively, some implementations may send a message to the CRM application 1010 to delete the original order 5 from the CRM application 1010. Middleware 1015 may send another message to the CRM application 1010 to insert the order 5 from the back-end processing system 1020.

The CRM application 1010 sends an acknowledgement message (step 1064*c*) that is received by middleware 1015 (step 1064*m*). Middleware 1015 sends a message to the CRM application 1010 to send order 2 to the back-end processing system 1020 (step 1068*m*). Middleware 1015 requests order 2 to correct the data integrity problem that order 6 had been detected only in the CRM application 1010.

The CRM application 1010 receives the message (step 1068*c*) and sends order 2 to middleware 1015 (step 1070*c*). Middleware 1015 receives and forwards order 2 to the back-end processing system 1020 (step 1070*m*).

The back-end processing system 1020 loads order 2 in a way that order 2 is consistent in the back-end processing system 1020 and the CRM application 1010. This may be accomplished as described previously with respect to step 1060*c*. The back-end processing system 1020 sends an acknowledgement message (step 1074*b*) that is received by middleware 1015 (step 1074*m*).

Implementations may include a method or process, an apparatus or system, or computer software on a computer medium. It will be understood that various modifications may be made. For example, advantageous results still could be achieved if steps of the disclosed techniques were performed in a different order and/or if components in the disclosed systems were combined in a different manner and/or replaced or supplemented by other components.

For example, FIG. 1 shows two enterprise application programs, each of which uses a separate data management system operating on different computer systems. Some implementations may use a single computer system to operate two data management systems. The data management systems involved may be used by the same or different enterprise application programs.

The techniques described here are applicable to other types of data management systems, such as an object-oriented database system that logically or physically organizes data into a series of objects (which may be referred to as an object-oriented database), a relational database that logically or physically organizes data into a series of database tables, or another type of data management system. For example, some systems may use a relational database system to store object data. Data may be stored physically in one or more relational database tables and organized logically as a series of objects. Typically, a relational database table may be used to store data belonging to a particular object class, and each row in the relational database table may represent an object instance.

Data also may be stored in a type of data management system that may not use a relational or object database. For example, a series of XML documents may be used.

Some implementations may allow the presence detection to be performed without performing the object instance attribute value comparison and/or the object instance attribute value comparison to be performed without performing the presence detection. In some cases the user may determine which type of comparison is to be performed.

Some implementations may include a list of particular object identifiers that are excluded from the data integrity process 300 even when a particular object instance meets the filter criteria for the comparison. A user or system administrator may identify one or more object instances to be excluded.

Some implementations may allow the comparison of an object type that occurs in more than two data management system. The object instances in the leading data management system may be compared with the two or more other contrast data management systems. By comparing the contrast data management system data with only the leading data management system data, the number of comparisons may be reduced and efficiency of the comparison may be improved. Other implementations may compare each identified data management system with all of the other identified data management systems.

Some implementations may allow all the object instances for a particular object type to be compared in two or more data management systems rather than applying a filter criteria to identify a subset of object instances for a particular object type to be compared. Alternatively or additionally, some implementations may allow the data integrity process (such as process 300, sub-process 340, or sub-process 345 described with respect to FIG. 3) to be run at a particular time and/or day (e.g., during off-hours, on a weekend day). This may be particularly beneficial when the number of object instances to be compared is large such that the extraction or comparison of instance identifiers or data values may negatively impact the performance of the computer systems on which the data management systems are located.

In some implementations the contract data management system may have the same capability and/or authority as the leading data management system. For example, the contrast data management system and the leading data management system both may initiate database operations (e.g., insert, update, and/or delete) and make query results. In some cases, only one data management system may initiate database operations and make query requests in one or both data management systems.

The benefits from the data integrity management techniques described here are not limited to comparing data across two or more data management systems and are equally applicable to other contexts. These techniques may be used to compare data within the same data management system. For example, when an object has referring objects (which also may be called dependent or child objects), these techniques may be used to compare the presence of referring object instances that relate to a particular object instance.

Other implementations are within the scope of the following claims.

What is claimed is:

1. A computer-implemented method for managing data integrity in a first data management system and a second data management system, each system having stored therein a plurality of data objects, each data object having at least one attribute that uniquely identifies a single data object from the other data objects, the method comprising:
    comparing object identifiers of data objects stored in the first data management system with object identifiers of data objects stored in the second data management system;
    pausing the data integrity management process to permit a user of the computer to determine whether to proceed with managing data integrity in response to results of the comparison of object identifiers;
    receiving an indication from the user whether to compare attribute values of the data objects stored in the first and second data management systems;
    comparing attribute values of data objects stored in the both first and second data management systems in response to an indication from the user to compare attribute values;
    receiving an indication from the user whether to correct data inconsistencies of the data objects stored in the both first and second data management systems based on results of the comparison of the attribute values of the data objects;
    correcting data inconsistencies in response to an indication from the user to correct data inconsistencies; and
    ending the data integrity management process in response to an indication from the user not to compare attribute values or in response to an indication from the user not to correct data inconsistencies.

2. The method of claim 1 wherein permitting the user to determine whether to proceed with managing data integrity comprises:
    presenting the number of data objects that occur in both the first data management system and the second data management system;
    presenting the number of data objects that occur in only the first data management system; and
    presenting the number of data objects that occur in only the second data management system.

3. The method of claim 1 wherein a data object comprises an object instance.

4. The method of claim 1 wherein a data object is stored in an XML document.

5. The method of claim 1 wherein a data object is stored in one or more rows in a database table.

6. The method of claim 1 wherein a data object comprises a data segment.

7. The method of claim 1 further comprising:
    extracting from the first data management system a first group of values of a uniquely identifying attribute, each value of the uniquely identifying attribute being associated with a single data object; and
    extracting from the second data management system a second group of values of the uniquely identifying attribute, each value of the uniquely identifying attribute being associated with a single data object.

8. The method of claim 1 wherein managing the data integrity of the data objects comprises:
    extracting from the first data management system a first group of data objects, each data object being associated with a first set of attribute values; and
    extracting from the second data management system a second group of data objects, each data object being associated with a second set of attribute values.

9. The method of claim 8 wherein:
    receiving an indication from the user whether to compare attribute values comprises receiving from the user an indication of a data object that is included both in the first group of data objects extracted from the first data management system and in the second group of data objects extracted from the second data management system; and
    comparing attribute values comprises providing the user with an indication of whether the first set of attribute values associated with the indicated data object is equal to the second set of attribute values associated with the indicated data object.

10. The method of claim 1 wherein correcting data inconsistencies comprises correcting detected inconsistencies by sending one or more data objects from the first data management system to the second data management system.

11. The method of claim 1 wherein correcting data inconsistencies comprises correcting detected inconsistencies by sending one or more data objects from the second data management system to the first data management system.

12. The method of claim 1 wherein correcting data inconsistencies comprises correcting detected inconsistencies by deleting one or more data objects from the first data management system.

13. The method of claim 1 wherein correcting data inconsistencies comprises correcting detected inconsistencies by deleting one or more data objects from the second data management system.

14. The method of claim 1 further comprising displaying on a display device of a computer an identity of one or more data objects from the data objects stored in the first and second data management systems.

15. A computer-readable medium having embodied thereon a computer program configured to manage data integrity in a first data management system and a second data management system, each system having stored therein a plurality of data objects, each data object having at least one attribute that uniquely identifies a single data object from the other data objects, the medium comprising one or more code segments configured to:
    compare object identifiers of data objects stored in the first data management system with object identifiers of data objects stored in the second data management system;
    pause the data integrity management process to permit a user of the computer to determine whether to proceed with managing data integrity in response to the results of the comparison of object identifiers;

receive an indication from the user whether to compare attribute values of the data objects stored in the first and second data management systems;

compare attribute values of data objects stored in the both first and second data management systems in response to an indication from the user to compare attribute values;

receive an indication from the user whether to correct data inconsistencies of the data objects stored in the both first and second data management systems based on results of the comparison of the attribute values of the data objects;

correct data inconsistencies in response to an indication from the user to correct data inconsistencies; and end the data integrity management process in response to an indication from the user not to compare attribute values or in response to an indication from the user not to correct data inconsistencies.

16. The medium of claim 15 wherein the one or more code segments configured to permit the user to determine whether to proceed with managing data integrity comprise one or more code segments configured to:

present the number of data objects that occur in both the first data management system and the second data management system;

present the number of data objects that occur in only the first data management system; and present the number of data objects that occur in only the second data management system.

17. The medium of claim 15 wherein a data object comprises an object instance.

18. The medium of claim 15 wherein a data object is stored in an XML document.

19. The medium of claim 15 wherein a data object is stored in one or more rows in a database table.

20. The medium of claim 15 wherein a data object comprises a data segment.

21. The medium of claim 15 further comprising one or more code segments configured to:

extract from the first data management system a first group of values of a uniquely identifying attribute, each value of the uniquely identifying attribute being associated with a single data object; and extract from the second data management system a second group of values of the uniquely identifying attribute, each value of the uniquely identifying attribute being associated with a single data object.

22. The medium of claim 15 wherein the one or more code segments configured to manage the data integrity of the objects comprise one or more code segments configured to:

extract from the first data management system a first group of objects provided to the user that meet the filter condition, each data object being associated with a first set of attribute values; and extract from the second data management system a second group of data objects provided to the user that meet the filter condition, each data object being associated with a second set of attribute values.

23. The medium of claim 15 wherein the one or more code segments configured to manage the data integrity of the data objects comprise one or more code segments configured to:

receive from the user an indication of a data object that is included both in the first group of data objects extracted from the first data management system and in the second group of data objects extracted from the second data management system; and provide the user with an indication of whether the first set of attribute values associated with the indicated data object is equal to the second set of attribute values associated with the indicated data object.

24. The medium of claim 23 wherein the one or more code segments configured to correct data inconsistencies comprise one or more code segments configured to correct detected inconsistencies by deleting one or more data objects from the second data management system.

25. The medium of claim 15 wherein the one or more code segments configured to correct data inconsistencies comprise one or more code segments configured to correct detected inconsistencies by sending one or more data objects from the first data management system to the second data management system.

26. The medium of claim 15 wherein the one or more code segments configured to correct data inconsistencies one or more code segments configured to correct detected inconsistencies by sending one or more data objects from the second data management system to the first data management system.

27. The medium of claim 15 wherein the one or more code segments configured to correct data inconsistencies comprise one or more code segments configured to correct detected inconsistencies by deleting one or more data objects from the first data management system.

28. The medium of claim 15 further comprising one or more code segments configured to display on a display device of a computer an identity of one or more data objects from the data objects stored in the first and second data management systems.

29. A computer-readable medium having embodied thereon a computer program configured to manage data integrity in a leading data management system and a contrast data management system, the medium comprising one or more code segments configured to:

extract from the leading data management system a first group of values of at least one attribute that uniquely identifies a single data object from the other data objects;

extract from the contrast data management system a second group of values of at least one attribute that uniquely identifies a single data object from the other data objects;

compare the first group of values of the uniquely identifying attribute with the second group of values of the uniquely identifying attribute to determine whether each value of the uniquely identifying attribute in the first group represent the same data object as a value of the uniquely identifying attribute in the second group;

based on the comparison, present a list of the values of the uniquely identifying attribute that are associated with both the leading data management system and the contrast data management system, the values of the uniquely identifying attribute that are associated with only the leading data management system, and the values of uniquely identifying attribute that are associated with only the contrast data management system;

receive an indication from a user whether to compare attribute values of the data objects in the leading data management system with attribute values of the data objects in the contrast data management system in response to the results of the presented list;

in response to an indication from the user to compare the attribute values of the data objects, extract from the leading data management system a first group of attribute value sets, each attribute value set being associated with a single data object that is included in both the leading data management system and the contrast data management system, extract from the contrast data management system a second group of attribute value sets, each attribute value set being associated with a particular data object that is included in both the leading data management system and the contrast data management system, and for each attribute value set extracted from the leading data management system, identify the attribute value set from the contrast data management system that represents the same data object and compare the attribute value set from the leading data management system with the attribute value set from the contrast data management system to determine whether the attribute value sets match, and present an indication whether the attribute value set from the leading data management system matches the attribute value set from the contrast data management system; and end the data integrity management process in response to an indication from the user not to compare the attribute values of the data objects.

30. The medium of claim 29 wherein the one or more code segments configured to manage data integrity comprise one or more code segments configured to:

determine which values of the at least one uniquely identifying attribute are associated with both the leading data management system and the contrast data management system;

determine which values of the at least one uniquely identifying attribute are associated with only the leading data management system; and determine which values of the at least one uniquely identifying attribute are associated with only the contrast data management system.

31. The medium of claim 29 wherein the one or more code segments configured to manage data integrity comprise one or more code segments configured to:

present the number of the values of the at least one uniquely identifying attribute are associated with both the leading data management system and the contrast data management system;

present the number of the values of the at least one uniquely identifying attribute are associated with only the leading data management system; and present the number of the values of the at least one uniquely identifying attribute are associated with only the contrast data management system.

* * * * *